United States Patent [19]
Bolton et al.

[11] Patent Number: 6,147,779
[45] Date of Patent: Nov. 14, 2000

[54] DIGITAL AUTOMATED ROLL CARRIER FILM SCAN MECHANISM

[75] Inventors: Richard H. Bolton, Rushville; Luther E. Chaplain, III; Wayne R. Cichetti, both of Rochester, all of N.Y.

[73] Assignee: Eastman Kodak Company, Rochester, N.Y.

[21] Appl. No.: 09/007,004

[22] Filed: Jan. 14, 1998

[51] Int. Cl.[7] .................................................. H04N 1/04
[52] U.S. Cl. ......................................... 358/487; 358/498
[58] Field of Search ................................... 358/487, 506, 358/498, 496, 474; 396/319, 411; 348/96; 242/332, 332.1, 354, 354.1

[56] References Cited

U.S. PATENT DOCUMENTS

| | | | |
|---|---|---|---|
| 5,625,468 | 4/1997 | Oosaka | 358/487 |
| 5,646,747 | 7/1997 | Watanabe et al. | 358/487 |
| 5,761,557 | 6/1998 | Orimoto | 396/411 |

*Primary Examiner*—Cheukfan Lee
*Attorney, Agent, or Firm*—Venable, Baetjer Howard, & Civiletti, LLP and Fredrikson & Byron, P.A.

[57] ABSTRACT

A method and apparatus for providing localized control of film, allowing high speed and high resolution continuous digital scanning of the film. The method includes continuously and precisely transporting the film, capturing successive slit images, and storing the images. The apparatus includes the use of a drive system to control the transport of the media being scanned. In a preferred embodiment, a dual capstan drive system under the control of a single motor provides localized tension and location control for the continuous transport of the film to be scanned, the capstans comprising a metal shaft. The preferred embodiment further comprises pinch rollers immediately adjacent to the capstans, the pinch rollers comprising a metal shaft covered with an elastomeric material. As a result of the accurate localized control of the film, high speed scanning is possible.

17 Claims, 7 Drawing Sheets

DIGITAL AUTOMATED ROLL CARRIER FILM SCAN MECHANISM

FIELD OF THE INVENTION

The present invention relates generally to the scanning of optically recorded information from film media and the conversion of that recorded information to its representative digital equivalent. More particularly, the present invention contemplates both a method and an apparatus for providing precise localized speed and location control of film, allowing the continuous and high speed acquisition of an electrical signal that represents a high resolution image of the underlying optically recorded information.

BACKGROUND OF THE INVENTION

The present invention is directed to processes and apparatus which quickly convert information from analog form (e.g., that which is contained on film, such as movie film or microfilm) to digital form. As the proliferation of electronic information continues, the capability to perform such a conversion at high speed would be beneficial in areas which require the digital version of large quantities of images presently contained in film media.

Conversion from film media to electronic form usually involves use of a charge couple device (CCD) image sensor. In particular, a linear CCD imager captures a one-dimensional image (i.e. it captures a row of pixels). A linear imager can provide high resolution and high speed scanning capability at a moderate cost. This type of device can be fabricated relatively inexpensively with high pixel counts, and high read-out speed. However, because a linear imager only captures one dimension of the target image, the underlying media must be externally scanned in an orthogonal direction to create a two-dimensional representation of the original film image.

Figure 1:
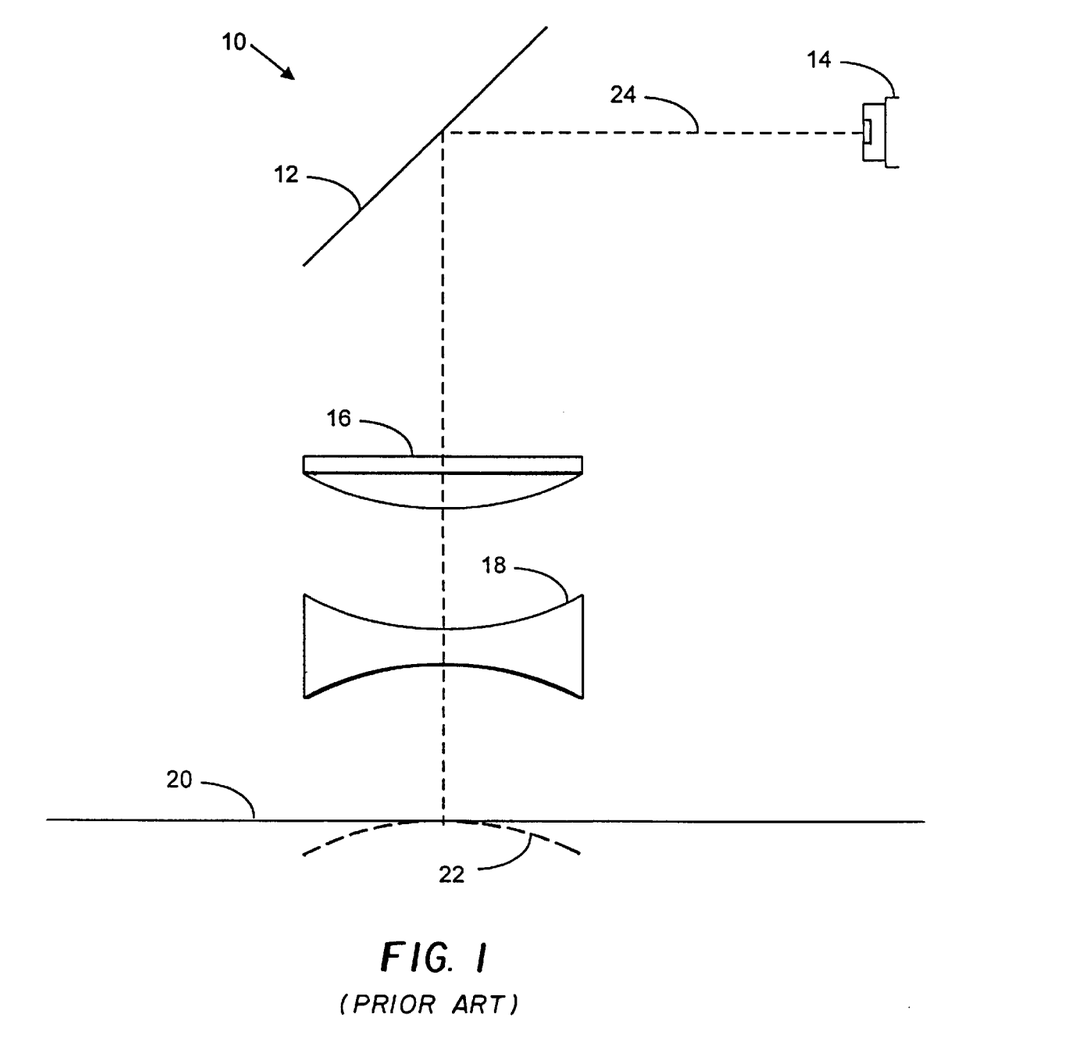
FIG. 1 shows a scanning approach according to the prior art which uses a movable (i.e. "nodding") mirror and a stationary CCD.

All known prior methods of performing such a scanning operation suffer from either mechanical or physical drawbacks. In general, two approaches were used. The linear CCD would be held stationary while the film would be moved to scan the images, or the film would be held stationary while the linear CCD would be moved to scan the images. One example of the first method, depicted in FIG. 1, involves the use of a "nodding" mirror to do the beam sweeping. In this method, a mirror 12 moves slightly back and forth, resembling a nodding motion. This scans the underlying film 20 in two dimensions, with the linear CCD assembly 14 providing the scan in the y direction (i.e. perpendicular to the direction of film travel) and the nodding motion of the mirror 12 providing the scan in the x direction (i.e. parallel to the direction of film travel). However, the use of the mirror 12 introduces resolution limitations which necessitate the use of an asymmetrical field flattener 18 which provides correction for the arc of best focus 22. The need for the asymmetrical field flattener 18 results from the slight differences in the focal distance between the mirror 12 and the film 20, which are caused by the nodding motion of the mirror 12.

Figure 2:
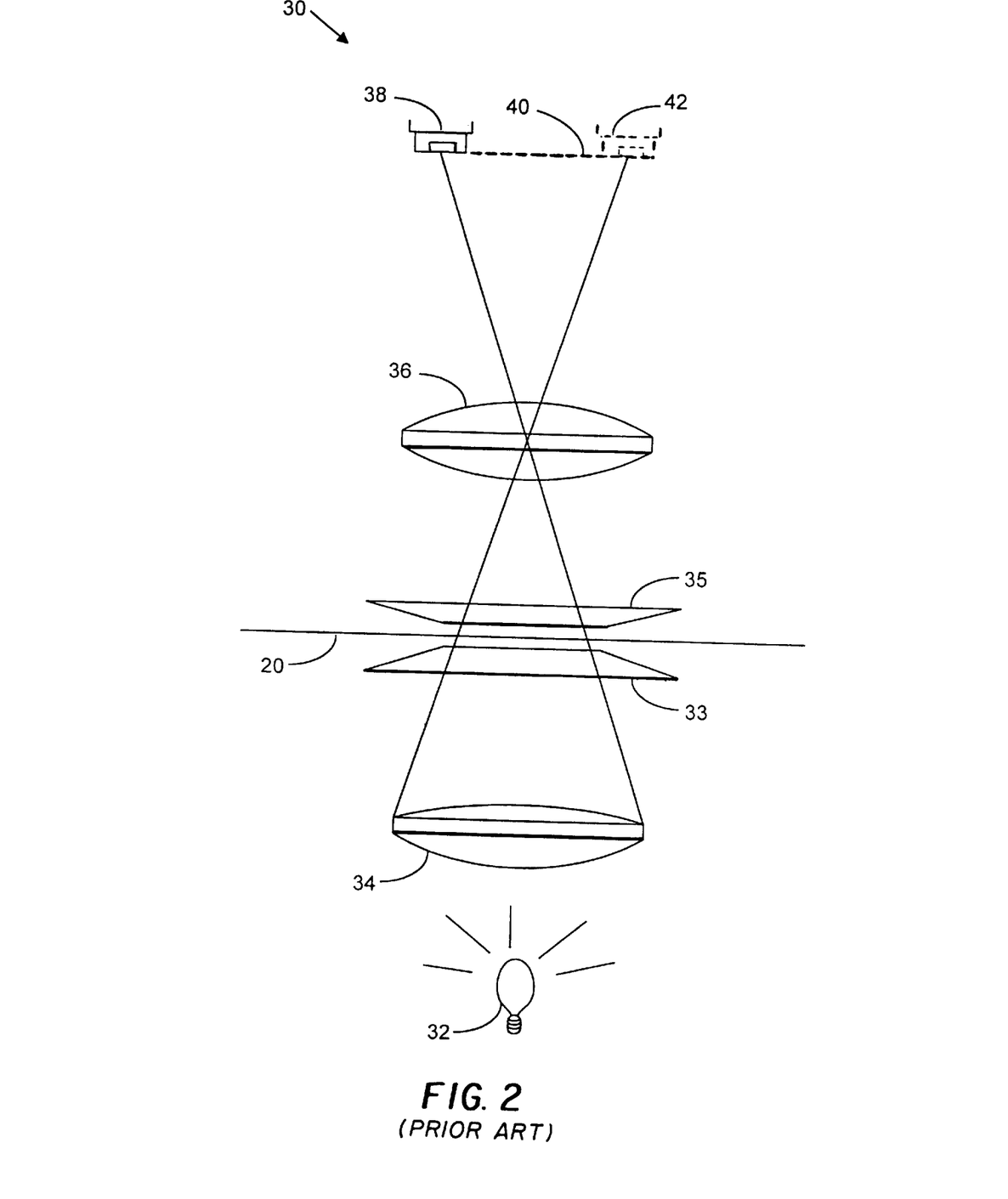
FIG. 2 shows a scanning approach according to the prior art which uses a movable CCD to capture an aerial image.

A second method according to the prior art involves holding the film 20 stationary and moving the linear CCD assembly 38 to perform the scan of the aerial image, as illustrated in FIG. 2. This method requires the linear CCD assembly 38 to accurately move through the image plane 40 to its final position 42. The close proximity required between the linear CCD assembly 38 and its signal processing and support circuits (not shown) means that the circuitry and associated cabling must be moved as well as the linear CCD assembly 38. This approach contains several drawbacks. First, the sheer bulk of the linear CCD assembly 38, its associated circuitry, and the mechanism necessary to move the assembly requires expensive mechanical translation components. In addition, these same factors limit the scanning speed of system operation. Furthermore, since the film 20 is held stationary in this method, only one image segment (i.e. frame of film) can be scanned at one time. Thus, once the current frame is scanned, the linear CCD assembly 38 must be moved from its final position 42 back to its starting point in preparation for scanning the next image. This limitation renders continuous film scanning impossible. One additional drawback to this method exists. In order to prevent focus errors in the aerial image 40, the film gate must maintain the film 20 in a precise location over the image area. This typically requires the use of optically suitable transparent 'flats' 33 and 35 which constrain the film 20 to a known location. The flats 33 and 35 accumulate dirt transported by the film 20 or deposited by thermal air currents. The accumulation of this dirt can scratch the glass and, therefore, necessitates periodic cleaning, along with creating imperfections in reconstructed pictures.

Figure 3:
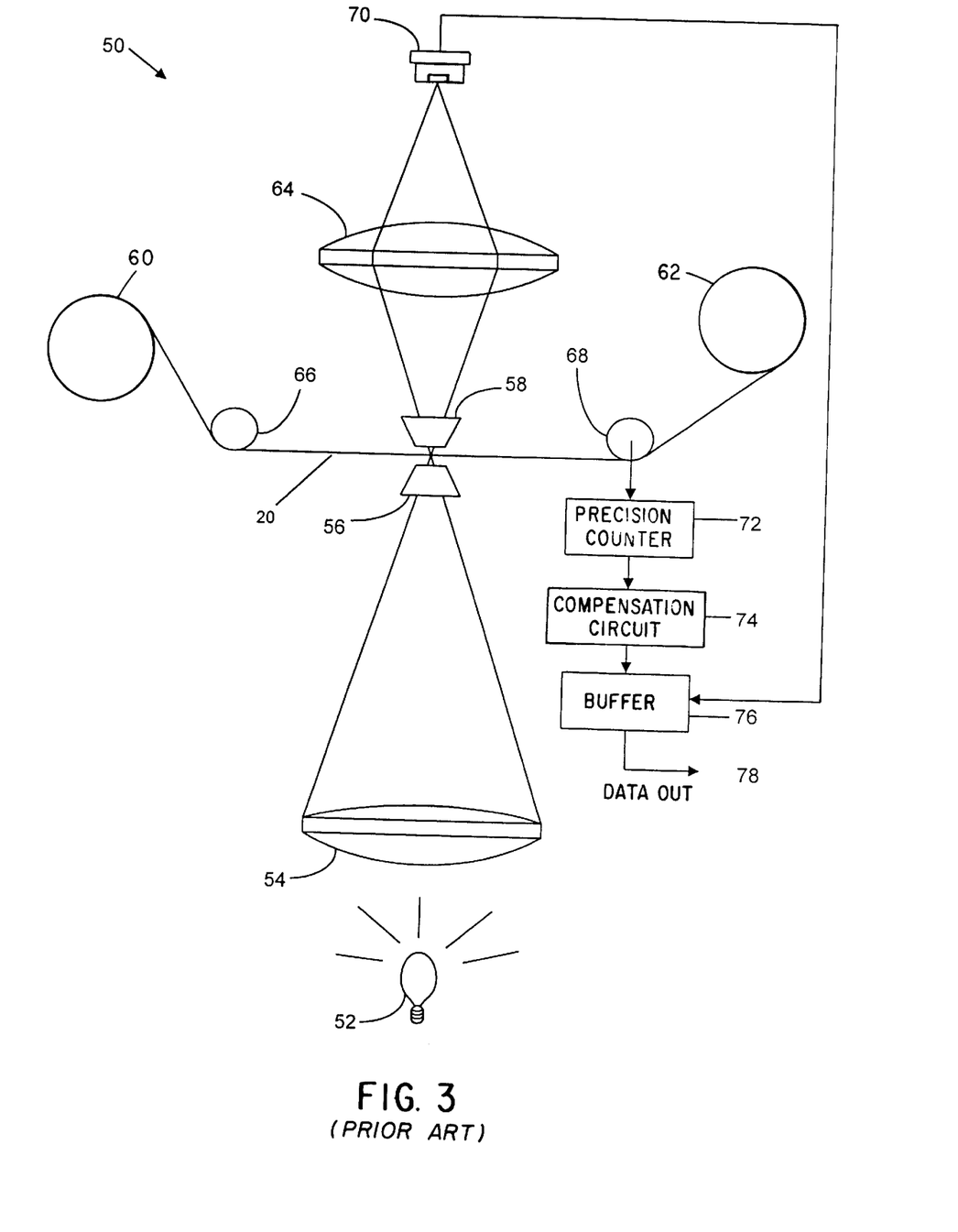
FIG. 3 shows a scanning approach according to the prior art which projects a slit image onto a linear CCD.

A third method according to the prior art entails projecting a slit image of the film 20 onto a linear CCD assembly 70 as shown in FIG. 3. The film 20 moves longitudinally, presenting a succession of image parts through the scan slit. Synchronization between the film motion and the CCD readout clocking creates a series of signals from the successively read scan slit images which collectively represent the original image. Since the linear CCD assembly 70 remains stationary in this method, and since the film gate is very narrow, a continuous scan is possible. However, precise translational accuracy at the scan slit must be maintained in order to prevent distortion of the acquired image. Variations in film speed will vary the time duration of sequential lines which will result in objectionable 'banding' in the image (i.e. noticeable variations in the image density). In order to avoid this effect, the prior art utilized a precision counter 72 to provide information on the film speed to a compensation circuit 74. The compensation circuit 74 would then attempt to counteract the adverse effects of film speed variations by properly indexing a buffer 76 of captured images, said indexed images then being fed on the data out line 78. Numerous factors, including but not limited to mechanical variations within the reel mechanism, the mass of the reels, the stretching of the film, and film tensioning variations within the reel render acquisition of an acceptable image impractical.

SUMMARY OF THE INVENTION

The present invention provides an improved method and apparatus for scanning film, thus advancing the state of the art in the acquisition of digital images from continuous scanning of film and other media. The invention comprises local control of film adjacent to a scan area which enables the high speed, continuous acquisition of high resolution images. The method and apparatus according to the present invention further comprise the use of a drive system to control the transport of the media being scanned. This approach permits very accurate positioning control of the film, allowing high speed and high resolution digital scanning.

In a preferred embodiment of the present invention, a dual capstan drive system provides localized tension and location control for the continuous transport of film or other similar media. The capstans are the primary position control element. Each capstan comprises a metal shaft. In a preferred embodiment, each metal shaft is a ground and polished stainless steel rod. Good surface finish, excellent diameter control (straightness, roundness and exactness), and corrosion resistance are properties of the steel rods important in accurately positioning and moving the film.

The invention further comprises a scan slit and an illumination means which projects a one-dimensional slit image to a linear CCD assembly. The linear CCD assembly captures the projected slit image, which then forms the digital representation of the film. By continuously scanning these projected slit images, a two-dimensional digital representation of the underlying media is achieved. This approach eliminates the need for any of the additional hardware described in the prior art (e.g. precision counters, compensation circuits, and data buffers).

As the capstans rotate, the film translates against them in direct proportion to the capstan rotation. The preferred embodiment further comprises pinch rollers immediately adjacent to the capstans. The pinch rollers are used to provide pressure on the film to engage the capstan and provide necessary friction between the film and the capstan. In a preferred embodiment, the pinch rollers have an elastomeric covering. In conjunction with the capstans, the pinch rollers transmit a uniform pressure across the film, which prevents the high pressure areas which would develop if the axes of the shafts of the capstan and the pinch roller were not perfectly aligned. As a result of the accurate localized control of the film, high speed scanning is possible.

In another preferred embodiment of the present invention, a single motor drives both capstans. A drive motor is coupled to one capstan, the drive capstan. One or more belts couple the drive capstan with the second capstan, the non-drive capstan. Although the two-motor technique is viable, it is much less desirable because of the cost of the additional drive and the extra sophistication needed to coordinate the motion of the two motors. This embodiment allows a less expensive version of the invention to be implemented.

This embodiment further comprises the use of one or more smooth belts, which prevent the errors which can occur when using gears or a toothed belt. Gear eccentricities and gear tooth error can induce small timing errors in the capstan rotation, which become readily noticeable in the captured digital image, especially at high resolution. The use of smooth belts of proper elasticity eliminates these errors.

BRIEF DESCRIPTION OF THE DRAWINGS

FIG. 8b shows a top view of the film threading process shown in FIG. 8a.

DETAILED DESCRIPTION OF THE INVENTION

Figure 4:
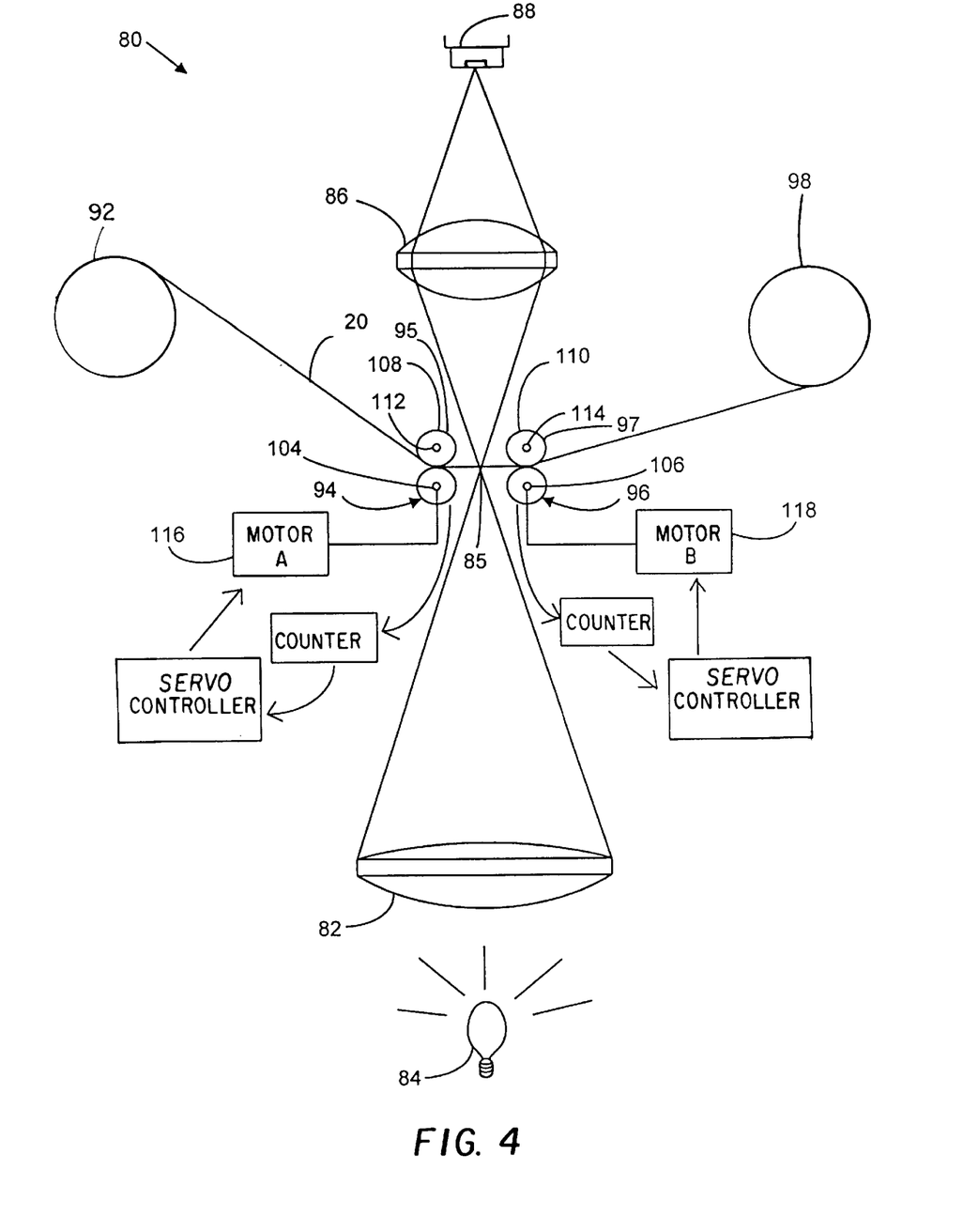
FIG. 4 shows one embodiment of the present invention which contains dual capstans to accurately hold the film for the linear CCD.

Referring now to the drawings, wherein like characters designate like or corresponding parts throughout the several views, there is shown in FIG. 4 a block diagram of a film scanning system 80, having a condenser lens 82 which focuses the light from the illumination means 84 on the scan slit 85. The objective lens 86 captures and focuses the slit image for the linear CCD assembly 88. The film 20 moves longitudinally from the supply reel 92 past capstan assemblies 94 and 96 to the take-up reel 98. The movement of the film past the scan slit 85 presents a series of one-dimensional images to the linear CCD assembly 88.

In a preferred embodiment, separate motors 116 and 118 control capstan assemblies 94 and 96 respectively. Each capstan assembly comprises a precision, ground metal capstan, 104 and 106, mounted with precision ball bearings at each end. The capstans are precisely mounted in an external frame (not shown). Similarly, pinch roller assemblies 95 and 97 comprise elastomeric coverings of moderate diameter, 108 and 110, which cover pinch rollers 112 and 114 respectively. In conjunction with pinch roller assembly 95, capstan assembly 94 exerts pressure on the film 20 and holds it in precise alignment with the scan slit 85. Powered by servo-controlled motor A, 116, capstan assembly 94 rotates and translates the film 20 past the scan slit 85 at a precise rate. Similarly, capstan assembly 96, in conjunction with pinch roller assembly 97 and powered by servo-controlled motor B, 118, also translates the film 20 past the scan slit 85. In the preferred embodiment, the use of independently driven capstans reduces the pinch roller contact pressure that would be required if only one capstan were to be driven. The use of a second capstan adds a drag load to the system. A system in which a motor only drives one capstan would consequently require a higher pull-through force. This would impart additional wear and tear on the film 20.

Furthermore, the use of independently driven capstans permits an exact differential tension to be induced via a microprocessor controller, which keeps the film 20 taut and, therefore, in focus throughout the scanning operation. Thus, the independently operated capstans assemblies 94 and 96 accurately meter the film 20 as it passes the scan slit 85, and provide significantly improved film location stability over prior art techniques.

The pinch roller assemblies 95 and 97 provide resistance against the capstan assemblies 94 and 96, which causes pressure to be exerted against the film 20. By covering the pinch rollers in an elastomeric material, a uniform pressure is exerted against the film along the length of the capstan shafts. The uniform pressure prevents high pressure areas from occurring, which normally develop when misaligned axes exist. On the other hand, the capstans are not covered. This allows their rotational velocities to be completely controlled by their associated servo-motors respectively.

Figure 5:
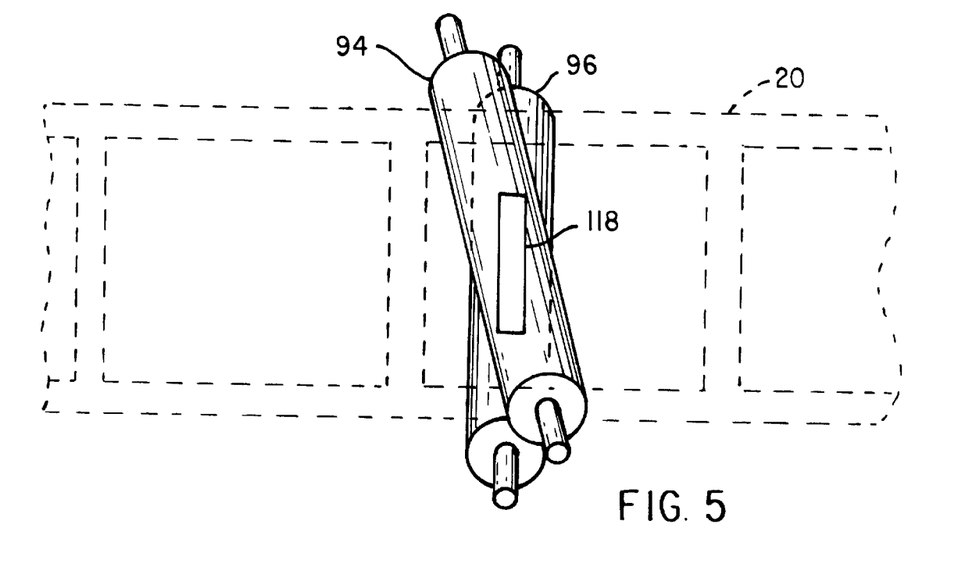
FIG. 5 shows the results of when the capstan exerts a nonuniform pressure on the film due, for example, to misalignment.

FIG. 5 illustrates a situation with (exaggerated) misaligned axes. Under normal manufacturing circumstances a skew would exist between the shafts, resulting in the contact area of the two shafts being considerably smaller than if the axes were not misaligned. If the pinch roller were made of a hard material (like metal), a very high pressure at the contact point would be generated, as depicted by the shaded area 118 in FIG. 5. The elastomeric coating around the pinch rollers prevents this pressure buildup from occurring. The elastomeric coatings, 108 and 110, also serve to minimize the lateral force on the film caused by the misaligned axes, which could lead the film to "wander" off its track.

Figure 6:
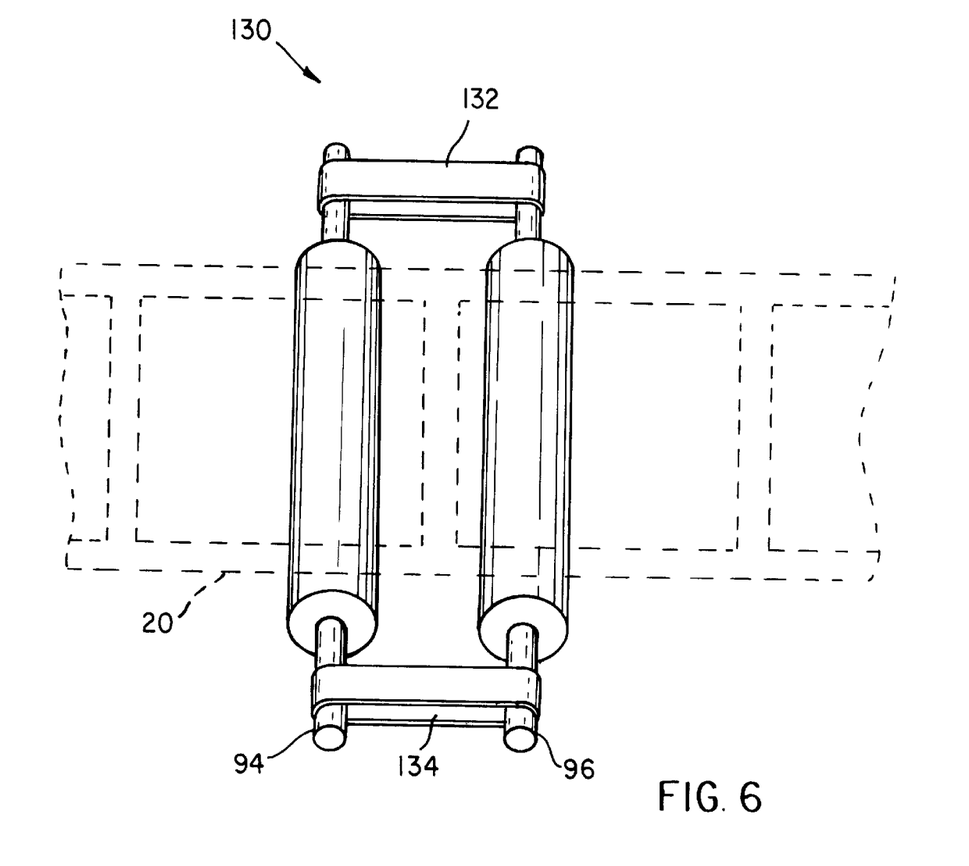
FIG. 6 shows another embodiment of the present invention which uses drive belts to reduce the number of motors required, thereby reducing cost.

FIG. 6 depicts another embodiment of the present invention. In this embodiment, only one servo-controlled motor drives both capstan assemblies 94 and 96. Said capstan assemblies 94 and 96 are coupled together using at least one smooth belt 132, although a preferred approach is to use two smooth belts 132 and 134. The use of smooth belts instead of gears to couple the capstans prevents gear tooth errors and velocity errors (caused, for example, by eccentricities in the gears) from being induced in the capstan rotation. Such errors would result in objectionable errors in the resultant images, particularly at high resolution.

Figure 7:
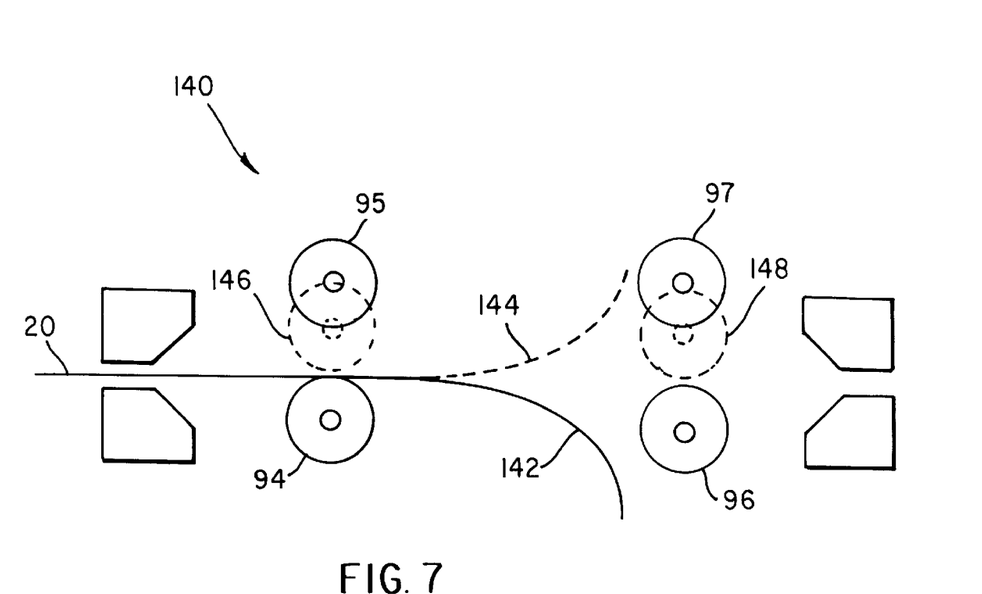
FIG. 7 shows some of the possible results of when a misfeed of curled film occurs.

FIG. 7 depicts a typical arrangement for threading the film 20 into the scanning system 140, and portrays some of the possible results which can occur if the curled film in the system is misfed. Film is usually wound on a core and contained in a cassette. Upon insertion in the scanning mechanism, the film must be threaded from the cassette onto an empty take-up spool to facilitate acquisition of the images along the film. This threading operation customarily occurs automatically upon insertion of the cassette. Due to the rapidity of the threading operation, the pinch roller assemblies 95 and 97 are lifted away from the capstan assemblies 94 and 96, which, during threading, move very slow in comparison to the film. In FIG. 7, the dotted pinch roller assemblies 146 and 148 depict the original location of the pinch roller assemblies 95 and 97. Typically, the storage of film 20 on the reel causes curling in the leading edge of the film 142 (or alternatively 144). This could lead to jamming or misfeeding against or between the pinch roller assemblies 95 and 97 or capstan assemblies 94 and 96.

Figure 8A:
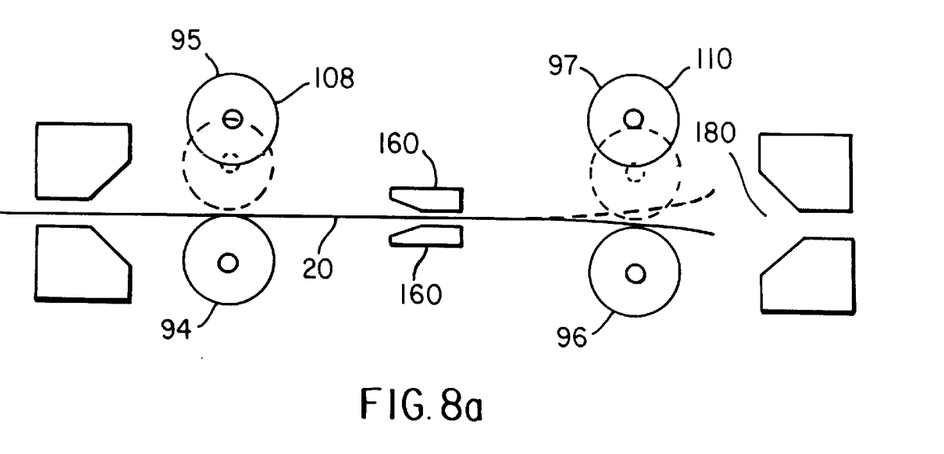
FIG. 8a shows the film threading process according to the prior art which involves the use of guides.
Figure 8B:
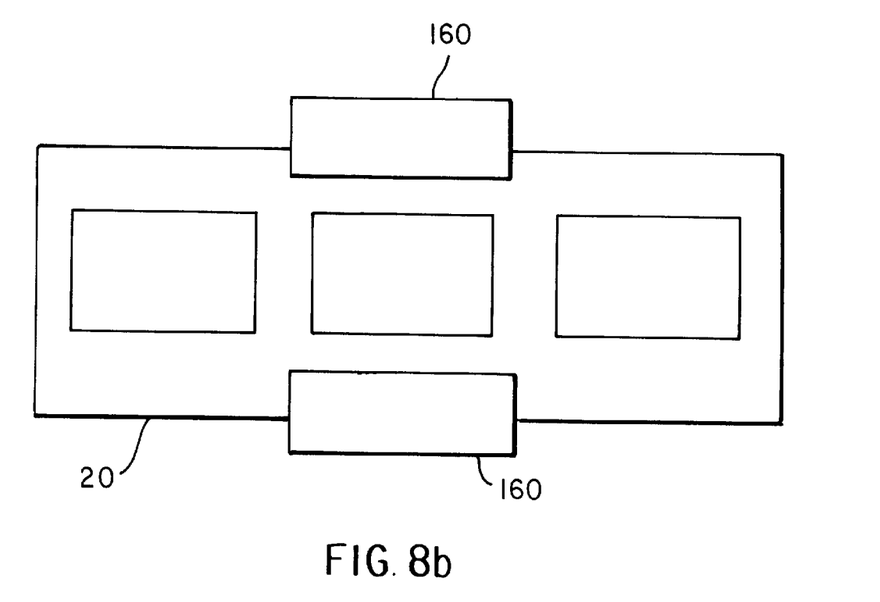

In order to prevent misfeeds, film guides 160 could be incorporated into the design of the scanning mechanism, as shown in FIGS. 8a and 8b. However, said film guides 160 encroach upon the image area and obliterate portions of the image. The film guides 160 also collect debris, which can result in scratching of the film 20 if not cleaned regularly.

Figure 9:
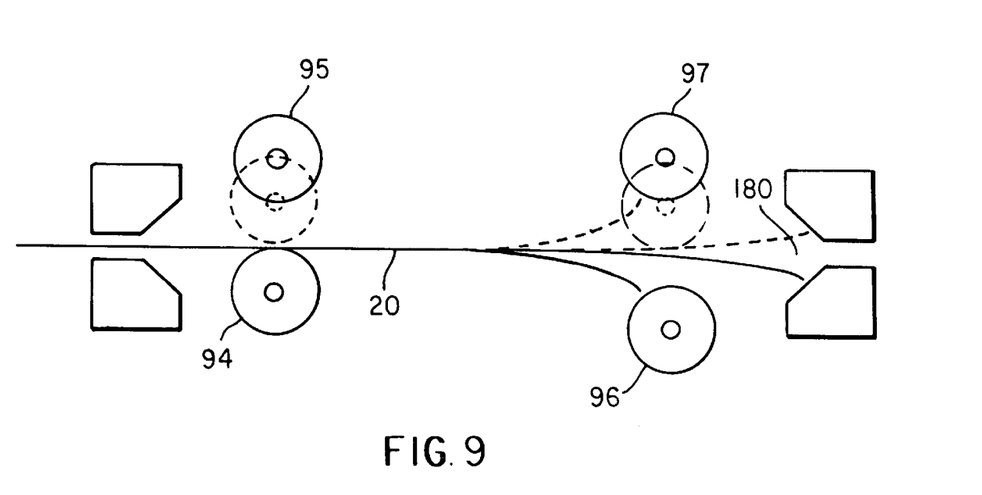
FIG. 9 shows a preferred embodiment of the present invention which eliminates the need for guides to control the threading of the film.

FIG. 9 depicts an apparatus according to the present invention which facilitates the automatic threading of film 20 by using the friction created between the film 20 and the capstans 94 and 96 and the pinch rollers 95 and 97. Despite the curling which might occur, the amount of curl is actually limited in practice. High reliability threading can be obtained by carefully controlling the location of the film 20 as it enters the capstan area, and by controlling the opening distance at the pinch roller assemblies 95 and 97. According to the preferred embodiment of the present invention, the pinch roller assemblies 95 and 97 are raised only enough to ensure that the tangent point is above the film curl. The film edge that then strikes the pinch roller assembly 97 will impart a rotating force to the roller. Since the pinch roller assembly 97 turns freely and is covered with a high friction elastomeric coating, the pinch roller assembly 97 will rotate slightly and guide the film 20 back toward its correct position, ultimately leading it to thread its way out the exit throat 180. The highly polished capstan assemblies 94 and 96 will tend to deflect film 20 automatically back toward the exit throat 180. In a preferred embodiment, the capstan assemblies 94 and 96 are also turned by their drive motor during threading, helping to thread any film which strikes them.

The invention has been described in detail with particular reference to the preferred embodiment thereof, but it will be understood that variations and modifications can be effected within the spirit and scope of the invention as described herein above and as defined in the appended claims.

Parts List 10 nodding mirror scanning system (prior art)
12 mirror
14 linear CCD assembly
16 objective lens
18 asymmetrical field flattener
20 film
22 arc of best focus
30 aerial image scanning system (prior art)
33 optical flat
35 optical flat
38 moving linear CCD assembly
40 image plane
42 final position of moving linear CCD assembly
70 stationary linear CCD assembly
72 precision counter
74 compensation circuit
76 buffer
78 data out
80 film scanning system
82 condenser lens
84 illumination means
85 scan slit
86 objective lens
88 high resolution linear CCD assembly
92 supply reel
94 capstan assembly
95 pinch roller assembly
96 capstan assembly
97 pinch roller assembly
98 take-up reel
104 capstan
106 capstan
108 pinch roller elastomeric covering
110 pinch roller elastomeric covering
112 pinch roller
114 pinch roller
116 motor A
118 motor B
120 high pressure contact area
130 film scanning system with single motor
132 smooth belt
134 smooth belt
140 film scanning system
142 film leading edge
144 film leading edge
146 original pinch roller location
148 original pinch roller location
160 film guides
180 exit throat

What is claimed is:

1. In a method of scanning a film containing a plurality of visual images and converting the plurality of visual images after such scanning into digital form, the improvement comprising the steps of:

a) providing a scanning means including a scan slit;
   b) providing a transport means for transporting the film to be scanned in close proximity to said scan slit, said transport means including a supply film reel with the film to be scanned wound thereabout, a pair of capstans, a pair of pinch rollers, and a take-up film reel;

c) automatically threading the film to be scanned through said transport means to said take-up film reel;

d) continuously driving said capstans to accurately and locally with respect to said scan slit, transport the film to be scanned past said scan slit;

e) projecting, with said scanning means, a slit image from said scan slit;

f) capturing a one-dimensional representation of said projected slit image;

g) converting said slit image to digital form;

h) storing said digital image; and i) repeating steps a) through h) until the film has been completely scanned.

2. A method according to claim 1, wherein the film is transported past said scan slit at a precise speed and precise location, whereby the transport force is separate and distinct from the pulling force of said take-up reel.

3. A method according to claim 1, wherein the film is simultaneously transported past said scan slit from both sides of said scan slit at a precise speed and precise location, whereby the transporting forces are separate and distinct from the pulling force of said take-up reel.

4. A method according to claim 3, whereby said transporting forces are independently controlled.

5. A method according to claim 4, whereby the process of automatically threading said film comprises controlling the position of the film as it enters said scan slit area.

6. A method according to claim 3, whereby said transporting forces are dependently controlled.

7. A method according to claim 6, whereby the process of automatically threading said film comprises controlling the position of the film as it enters the scan slit area.

8. Apparatus for scanning a strip of film containing a plurality of visual images and converting the plurality of visual images after such scanning into digital form, comprising;

means for continously feeding film from a supply film reel; scanning means including a scan slit;

a capstan assembly, said capstan assembly including means for providing localized control of the film being fed in proximity to said scan slit;

a pinch roller assembly, said pinch roller assembly including means for exerting pressure on the film in proximity to said scan slit;

means for projecting a slit image of the film being fed;

means for capturing said image in digital form;

means for continuously receiving the film which has been scanned and storing said scanned film on a take-up film reel.

9. An apparatus according to claim 8, wherein said capstan further comprises a hard metal shaft.

10. An apparatus according to claim 9, wherein said capstan assembly further comprises a precision ground, metal capstan mounted with precision ball bearings.

11. An apparatus according to claim 10, wherein said pinch roller assembly further comprises a pinch roller and an elastomeric coating.

12. An apparatus according to claim 11, wherein said pinch roller further comprises a hard metal shaft.

13. Apparatus for scanning a strip of film containing a plurality of visual images and converting the scanned plurality of images after such scanning into digital form, comprising:

means for continuously feeding film from a supply film reel;

scanning means including a scan slit;

a plurality of capstan assemblies, said capstan assemblies including means for providing localized control of said film being fed in proximity to said scan slit;

means for projecting a slit image of said film being fed;

means for capturing said image in digital form;

means for continuously receiving film which has been scanned and storing said scanned film on a take-up film reel.

14. An apparatus according to claim 13, wherein each of said capstan assemblies further comprises a hard metal shaft.

15. An apparatus according to claim 14, wherein each of said capstan assemblies further comprise a precision ground, metal capstan mounted with precision ball bearings.

16. An apparatus according to claim 15, wherein each of said pinch roller assemblies further comprises a pinch roller and an elastomeric coating.

17. An apparatus according to claim 16, wherein each of said pinch rollers further comprises a hard metal shaft.

* * * * *